(12) United States Patent
Hattori

(10) Patent No.: US 9,154,307 B2
(45) Date of Patent: Oct. 6, 2015

(54) SYSTEM, APPARATUS, APPLICATION AND METHOD FOR BRIDGING CERTIFICATE DEPLOYMENT

(71) Applicant: Tomoki Hattori, Suwanee, GA (US)

(72) Inventor: Tomoki Hattori, Suwanee, GA (US)

(73) Assignee: RICOH COMPANY, LTD., Tokyo (JP)

( * ) Notice: Subject to any disclaimer, the term of this patent is extended or adjusted under 35 U.S.C. 154(b) by 15 days.

(21) Appl. No.: 14/034,013

(22) Filed: Sep. 23, 2013

(65) Prior Publication Data

US 2015/0089215 A1    Mar. 26, 2015

(51) Int. Cl.
*H04L 9/32*     (2006.01)

(52) U.S. Cl.
CPC .................................. *H04L 9/3263* (2013.01)

(58) Field of Classification Search
CPC ............ H04L 63/0823; H04L 63/0442; H04L 9/3294; H04L 9/3263; H04L 9/3297; G06F 21/33
USPC .......................... 713/156, 175; 726/5; 380/277
See application file for complete search history.

(56) References Cited

U.S. PATENT DOCUMENTS

| | | | |
|---|---|---|---|
| 7,386,721 B1 | 6/2008 | Vilhuber et al. | |
| 7,421,503 B1 | 9/2008 | Stieglitz et al. | |
| 7,793,285 B2 | 9/2010 | Hattori et al. | |
| 8,095,788 B2 | 1/2012 | Vilhuber et al. | |
| 8,185,887 B2 | 5/2012 | Hattori | |
| 8,261,259 B2 | 9/2012 | Hattori | |
| 8,341,250 B2 | 12/2012 | Pritikin et al. | |
| 2006/0020784 A1* | 1/2006 | Jonker et al. | 713/157 |
| 2006/0075477 A1* | 4/2006 | Shenoy | 726/7 |
| 2006/0168443 A1* | 7/2006 | Miller et al. | 713/156 |
| 2007/0233834 A1 | 10/2007 | Hattori et al. | |
| 2008/0046735 A1 | 2/2008 | Nedeltchev et al. | |
| 2008/0235241 A1 | 9/2008 | Hattori et al. | |
| 2009/0059272 A1 | 3/2009 | Matsushita et al. | |
| 2011/0231919 A1* | 9/2011 | Vangpat et al. | 726/8 |
| 2011/0261391 A1 | 10/2011 | Oba et al. | |
| 2013/0141747 A1 | 6/2013 | Oba et al. | |
| 2013/0173907 A1* | 7/2013 | Lakshminarayanan et al. | 713/153 |
| 2013/0318343 A1* | 11/2013 | Bjarnason et al. | 713/157 |

OTHER PUBLICATIONS

Xiaoyi Liu et al., "Cisco System's Certificate Enrollment Protocol", Aug. 29, 2003.
A. Nourse et al., "Cisco Systems' Simple Certificate Enrollment Protocol draft-nourse-scep-19", Apr. 2009, Internet Engineering Task Force.
Ted Shorter et al., "The Use of the Simple Certificate Enrollment Protocol (SCEP) and Untrusted Devices", 2012, Certified Security Solutions, Inc.
U.S. Appl. No. 13/779,687, filed Feb. 27, 2013, Tomoki Hattori.
U.S. Appl. No. 14/018,689, filed Sep. 5, 2013, Tomoki Hattori.

* cited by examiner

*Primary Examiner* — Matthew Smithers
(74) *Attorney, Agent, or Firm* — Cooper & Dunham LLP

(57) ABSTRACT

An apparatus, system and method is provided for bridging (i) a certificate registration apparatus that communicates with a certificate deployment target based on a specific certificate deployment protocol and (ii) a target deployment device that is not configured to conform to the specific certificate deployment protocol, within a public key infrastructure (PKI).

19 Claims, 22 Drawing Sheets

| CSR Fields | |
|---|---|
| Version | 0 |
| Distinguished Name (DN) | www.ricoh-usa.com/printer64 |
| Public Key | 3048 0241 00C9 18FA CF8D EB2D<br>EFD5 FD37 89B9 E069 EA97 FC20 |
| Attributes | (see Fig. 7) |

Fig. 6

| Attributes in CSR Fields | |
|---|---|
| Organization | Ricoh |
| Department | Research and Development |
| Physical Address | 70 Valley Stream Parkway<br>Malvern, Pennsylvania 19355 |
| Country | US |
| E-Mail Address | research@ricoh-usa.com |

Fig. 7

Logged in as: Robert Brown (admin)

Please Confirm the Information is Correct.

Public Key:
3048 0241 00C9 18FA CF8D
EB2D EFD5 FD37 89B9 E069

Private Key:
5E35 F577 EE31 C4FB C6E4
4811 7D86 BC8F BAFA 362F

Distinguished Name (DN): www.ricoh.com/MFP101   Version: 0

| Attributes | |
|---|---|
| Organization | Ricoh Company, Ltd |
| Department | Finance |
| Address | 8-13-1 Ginza, Chuo-ku Tokyo 104-8222 |
| Country | JP |
| E-Mail Address | Finance@ricoh.com |

Submit   Back   Help

Fig. 11G

SYSTEM, APPARATUS, APPLICATION AND METHOD FOR BRIDGING CERTIFICATE DEPLOYMENT

TECHNICAL FIELD

This disclosure relates to tools (such as systems, apparatuses, methodologies, computer program products, etc.) for deploying certificates to devices that do not conform to a certificate enrollment protocol in a public key infrastructure.

BACKGROUND

In the current information age, information technology (IT) tools play a significant role in our daily activities. With the proliferation of electronic devices (e.g., desktop computers, notebook computers, tablets, PDAs, smut phones, etc.) in the world, it has been increasingly difficult to keep track of individual devices connected to a network. Such situation is further exacerbated in organizations where a large number of electronic devices are interconnected through the same network to facilitate sharing of data and other information, much of which may be confidential and even possibly proprietary. In order to make the network infrastructure more secure, device management becomes rather complex.

For example, many networks employ a public key infrastructure (PKI) such that in order for a device to be permitted to connect to the network, the device must be authenticated, such as via a public key certification process. More specifically, the PKI is a system for creating, storing and distributing digital certificates which are used to verify that a particular key belongs to a certain user, device or entity. That is, the PKI includes a certificate authority (CA) to create digital certificates which map public keys to users, devices or entities, securely store these certificates in a central repository, and revoke them if necessary.

In order to facilitate and standardize deployment of such certificates in a scalable manner, several protocols have been proposed. However, in order to keep certificates less burnable (i.e. the objective that each certificate is associated with one, and only one, device), many deployment protocols require one-by-one security configuration transaction/deployment. One such protocol is the Simple Certificate Enrollment Policy (SCEP) protocol. It takes much time to construct secure infrastructure for large scale network environment, for initial deployment as well as refreshing security settings for periodic updates or renewals.

An example of a system employing the SCEP protocol is shown in FIG. 1. In such system shown in FIG. 1, a SCEP server 101 and a device 103 are interconnected by network 104. The SCEP server 101 operates as a registration authority to register certificates and associated information for devices (e.g., terminal, printers, other devices, etc.) authorized to be connected in the network environment 104. For example, upon initial registration/certification of a device, the SCEP server 101 communicates, when necessary, with a certificate authority (CA) 102 through firewall 109 for purposes of key pair update, certificate update or renewal, etc. The SCEP server 101 operates in conformance with the SCEP protocol, and as such, each of the devices communicating with the SCEP server 101 must also conform with the SCEP protocol. When a device communicating with the SCEP server 101 conforms with the SCEP protocol, the certification process can be largely automated.

For example, in order to obtain a certificate, a certificate signing request (CSR) in a format specified by the Public-Key Cryptography Standards (PKCS) must be generated and transmitted to the CA. More specifically, the PKCS standard for generating a CSR is PKCS#10. The message under the PKCS#10 requires information which identifies the user, such as version of the PKCS#10 standard supported, the public key previously generated, and various attributes. Such attributes include a distinguished name (DN), organization name, department name (organizational unit), physical address, country, email address, etc. By generating the CSR with the required information, the user has created a certificate. However, such certificate must also be digitally signed by the CA. The communication to sign the certificate must conform to the PKCS#7 standard which assumes that the communicating entities already posses the certificate and requires both entities to use the issuer names (i.e. DN) and issuer assigned certificate serial numbers to identify the certificate in order to verify the signature and decrypt the message. The PKCS#7 standard specifies the syntax of certificates and other encrypted information (i.e. the method by which data is encrypted and digitally signed, as well as the algorithms involved). The certificate is encrypted pursuant to PKCS#7 and may further be encrypted by using the private key previously generated. By performing these encryptions, the certificate has been "signed" to indicate that the user was the one who created the certificate.

However, such approach cannot be employed if the device to be connected does not conform to the SCEP protocol, or the certificate deployment protocol employed for the network environment.

SUMMARY

Various tools (for example, a system, an apparatus, application software, etc.) can be configured to bridge a SCEP server, or another certificate registration apparatus, that communicates with a certificate deployment target based on a specific certificate deployment protocol. For example, a certificate deployment bridging apparatus may be connected to a network to operate, within a public key infrastructure (PKI), as a bridge between (i) a certificate registration apparatus that communicates with a certificate deployment target based on a specific certificate deployment protocol and (ii) a target deployment device that is not configured to conform to the specific certificate deployment protocol.

Such certificate deployment bridging apparatus may be configured to include a server interface to communicate, in conformance with the specific certificate deployment protocol, with a certificate registration apparatus, and a device interface that communicates with a target deployment device that is not configured to conform to the specific certificate deployment protocol. The certificate deployment bridging apparatus transmits a request to the target deployment device for specific items of information in a certificate signing request corresponding to the target deployment device, and causes the target deployment device to generate a key pair including a private key and a public key. After obtaining the requested items of information in the certificate signing request from the target deployment device (e.g., the target deployment device uploads the information to a particular location specified by the target deployment device or by the certificate deployment bridging apparatus) and obtaining the key pair of the private key and the public key generated by the target deployment device (e.g., the target deployment device uploads the key pair to a specific location specified by the target deployment device or by the certificate deployment bridging apparatus), the certificate deployment bridging apparatus generates a self-signed certificate based on the items of information identifying the target deployment device and including the public key generated by the target deployment device, in conformance with the specific certificate deployment protocol, employs a certificate from a certificate authority to encrypt the self-signed certificate and transmits the encrypted self-signed certificate, through the server interface part, to the certificate registration apparatus. Thereafter, the certificate deployment apparatus uploads the self-signed certificate to a location accessible by the target deployment device, and causes the target deployment device to download the self-signed certificate from the location. Such bridging enables certification of the target deployment device which is not configured to conform to the specific certificate deployment protocol to provide the required information to be certified.

In another aspect, the certificate deployment bridging apparatus obtains a new certificate encrypted by the public key of the key pair, from the certificate registration apparatus, applies the private key of the key pair to extract the new certificate, and causes the new certificate to be installed to the target deployment device.

In another aspect of this disclosure, the certificate deployment bridging apparatus generates the certificate signing request and the key pair and generates the self-signed certificate, in conformance with the specific certificate deployment protocol, and employs a certificate received from the certificate authority to encrypt the self-signed certificate and transmit the encrypted self-signed certificate to the certificate registration apparatus.

In another aspect, the certificate deployment apparatus can obtain at least some of the specific items of information corresponding to the target deployment device from a device management apparatus that manages devices connected to the network and maintain device information corresponding to the managed devices.

In another aspect, the certificate deployment apparatus uploads the certificate signing request and key pair to one or more specific locations accessible by the target deployment device, and causes the target deployment device to download the certificate signing request and/or key pair from the specific location(s).

BRIEF DESCRIPTION OF THE DRAWINGS

The aforementioned and other aspects, features and advantages can be more readily understood from the following detailed description with reference to the accompanying drawings wherein:

FIG. 6 shows an example of information for generating a certificate signing request.

FIG. 7 shows an example of an attribute field of information for generating a certificate signing request;

FIGS. 11A-11G show examples of user interface display screens displayed on a bridging apparatus, according to the exemplary embodiments shown in FIGS. 2A-2C;

DETAILED DESCRIPTION

Figure 1:
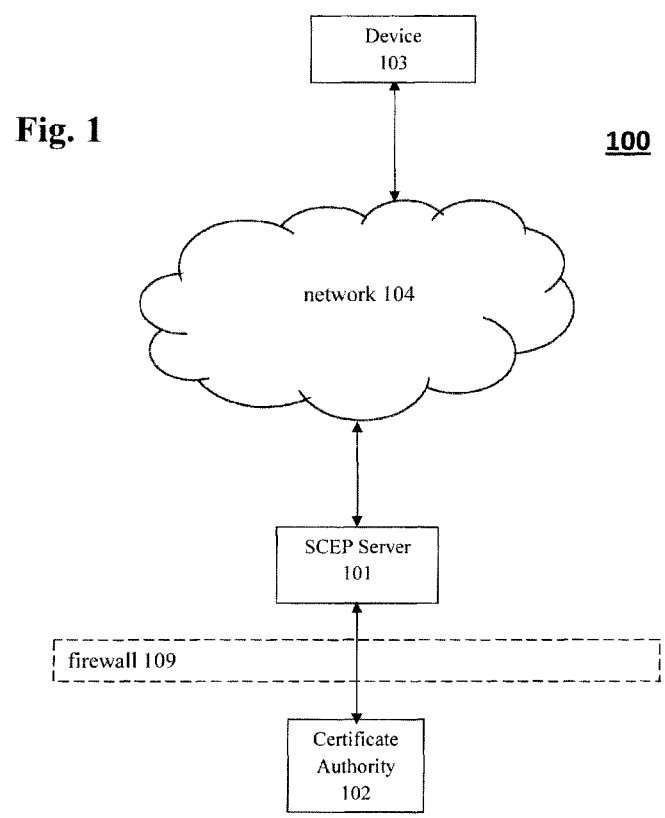
FIG. 1 shows a block diagram of a conventional configuration of a system for certificate deployment, following the SCEP protocol, in a public key infrastructure (PKI).

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted when it may obscure the subject matter of the present invention. Referring now to the drawings, wherein like reference numerals designate identical or corresponding parts throughout the several views, there are described tools (systems, apparatuses, methodologies, computer program products, etc.) for communicating with a client device that is not configured to conform to a specific certification protocol in a public key infrastructure.

Figure 2A:
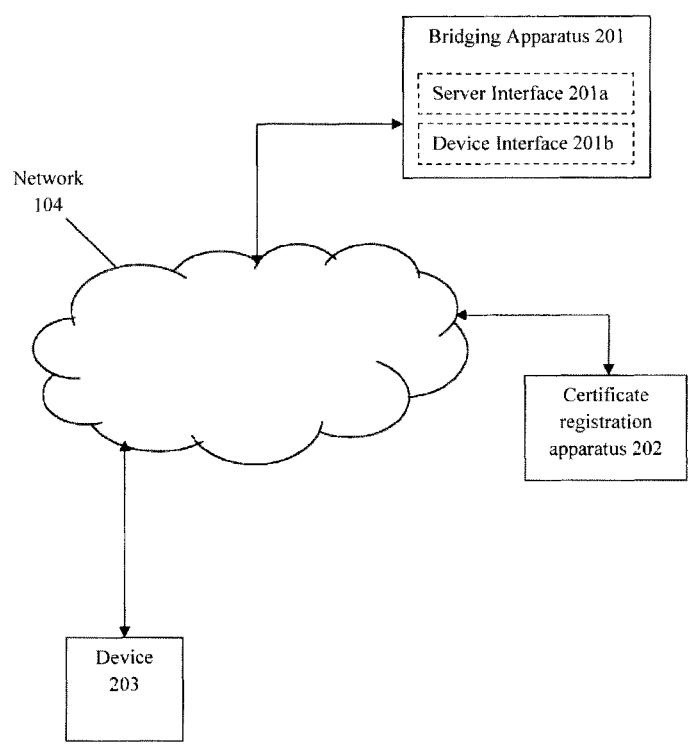
FIG. 2A shows a block diagram of a system for certificate deployment in a PKI, according to an exemplary embodiment.

FIG. 2A shows schematically a system 200A that includes, all of which are interconnected by network 104, a bridging apparatus 201, a certificate registration apparatus 202 and a device 203.

The bridging apparatus 201 can be any computing device, including but not limited to a personal, notebook or workstation computer, a kiosk, a PDA (personal digital assistant), a mobile phone or handset, another information terminal, etc., that can communicate with other devices through the network 104. Although only one bridging apparatus is shown in FIG. 2A, it should be understood that the system 200A can include a plurality of bridging apparatuses 201 (which can have similar or different configurations). The bridging apparatus 201 is further described infra with reference to FIG. 3.

The role of the bridging apparatus 201 is to serve as a medium for communications between the certificate registration apparatus 202 and the device 203. In this case, the device 203 cannot obtain a certificate from the certificate registration apparatus 202 as the device 203 does not have a protocol (i.e. SCEP) that the certificate registration apparatus 202 is currently using implemented. In order to permit the device 203 to be certified as a trusted device, an administrator, who is previously certified by a CA, currently operating the bridging apparatus 201 must first communicate with the device 203 using a protocol that is native to the device 203 and obtain information required for the CSR. Next, the bridging apparatus 201 formats a message containing the required information (i.e. PKCS#10) and generates the message as a self-signed certificate (i.e. PKCS#7) using the protocols the certificate registration apparatus 202 communicates in. The bridging apparatus 201 then sends the self-signed certificate to the certificate registration apparatus 202. In the case that the certificate is approved, the certificate registration apparatus 202 digitally signs the certificate which verifies its authenticity and the device 203 is able to be certified as a trusted device.

The server interface 201a allows the bridging apparatus 201 to communicate with the certificate registration apparatus 202 using protocols that are currently implemented by the certificate registration apparatus 202 (i.e. SCEP). For example, once the bridging apparatus obtains the information required for a CSR from the device 203, the information required is formatted (i.e. PKCS #10) and generated as a self-signed certificate (i.e. PKCS#7) using the protocols the certificate registration apparatus 202 communicates in, Then, the bridging apparatus 201a sends through the server interface 201a to the certificate registration apparatus 202 the self-signed certificate.

The device interface 201b is configured to communicate with any particular device amongst plural heterogeneous devices that may be included in the system 200A in a communication format native to the particular device. The device interface 201b may determine an appropriate communication format native to the particular device by any of various known approaches. For example, the device interface 201b may refer to a database or table, maintained internally or by an outside source, to determine an appropriate communication format native to the device. As another example, the device interface 201b may access an Application Program Interface (API) of the particular device, in order to determine an appropriate communication format native to the device.

In addition, the device interface 201b is also used to obtain information required for generating a CSR from a device that cannot communicate with the certificate registration apparatus 202. For example, the device interface 201b may request the device 203 for information required for a CSR. Further, the device interface 201b may also cause the device 203 to generate a pair of public and private keys.

The certificate registration apparatus 203 distributes certificates to trusted devices and can be a server, a desktop computer, or plurality of either located in an organization (government departments, companies, non-profit organizations, etc.). In addition, the certificate registration apparatus 203 is previously certified by a CA to distribute certificates to devices located within or are connected to the organization. In a case in which a device, such as device 203, needs to be certified as a trusted device in order to communicate with other devices in the organization, it is not necessary for the device to obtain a certificate from the CA. Instead, the device 203 can request a certificate from the certificate registration apparatus 203. This is more convenient as any issues that occur can be resolved quickly.

The device 203 can be any electronic device, including but not limited to a personal, notebook or workstation computer, a kiosk, a PDA (personal digital assistant), a mobile phone or handset, another information terminal, printer, multi-functional printer, scanner, fax machine, etc., that can communicate with other devices through the network 104. Further, it is not necessary that device 203 be implemented with communication protocols that are native to the certificate registration apparatus 202. Although only one device 203 is shown in FIG. 2A, it should be understood that the system 200A can include a plurality of device 203 (which can have similar or different configurations). The device 203 is further described infra with reference to FIGS. 3, 4 and 5.

The terms "printer" and "printer device" are used hereinafter generically to include any output device having a printing or plotting functionality, and include multifunction devices having a copy and/or scanning functionality in addition to the printing or plotting functionality.

The network 104 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 103. In addition, the network 103 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2B:
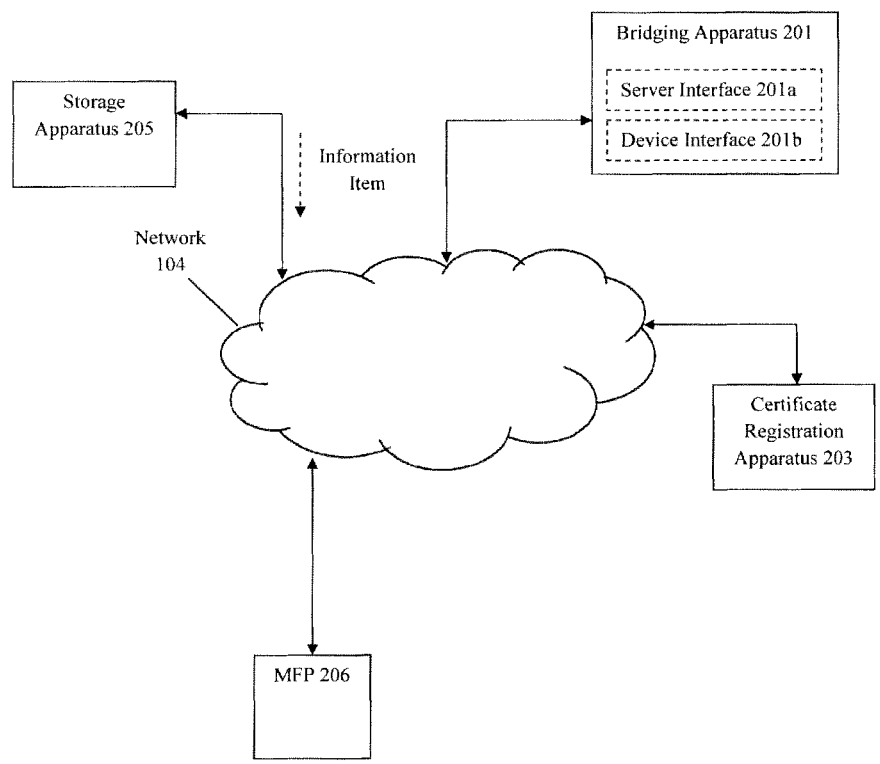
FIG. 2B shows a block diagram of a system for certificate deployment in a PKI, according to another exemplary embodiment.

FIG. 2B shows schematically a system 200B, according to another exemplary embodiment. The system 200B is similar to the system 200A except that the system additionally includes a storage apparatus 205 and an MFP 206.

The storage apparatus 205 stores information required for the CSR. When the bridging apparatus 201 sends a request to the MFP 206 asking for the required information, the MFP 206 may respond by storing the required information into the storage apparatus 205 and then provide the location (i.e. URL) of the storage apparatus 205 to the bridging apparatus 201. Once the bridging apparatus 201 obtains the location from the MFP 206, the bridging apparatus 201 can start to download the required information. In addition to storing the required information, the storage apparatus 205 may store the public and private key of the MFP 206 as well. In the same manner, the MFP 206 generates a pair of public and private keys, stores the keys into the storage apparatus 205 and provides the location of the keys to the bridging apparatus 201. Then, the bridging apparatus 201 can start to download the keys. Alternatively, the storage apparatus 205, may also store the public and private key of MFP 206 which was generated by the certificate registration apparatus 202.

Figure 5:
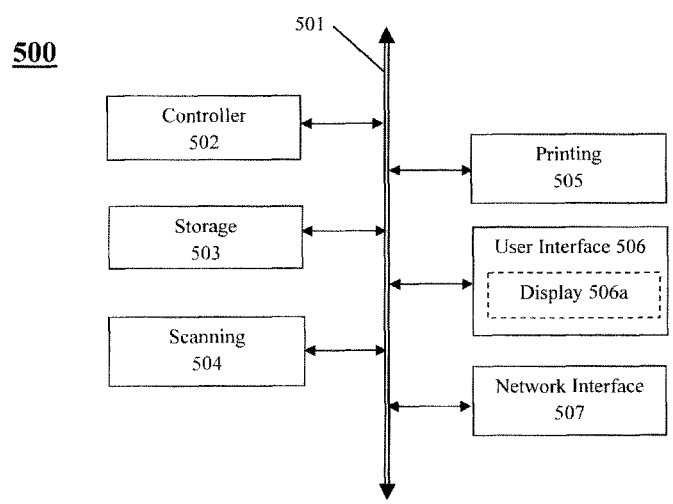
FIG. 5 shows a block diagram of an exemplary configuration of a multi-function device.

The MFP 206 can be, for example a printer/scanner, printer/scanner/fax, etc. While this example of this disclosure simply refers to a single MFP 206 in the interest of brevity, it should be appreciated that the network environment can have an arbitrary number of MFP devices. The MFP 206 may be configured as shown in FIG. 5, which is discussed infra.

Otherwise, operations of the elements of the system 200B are similar to those discussed in connection with the corresponding elements of the system 200A of FIG. 2A.

Figure 2C:
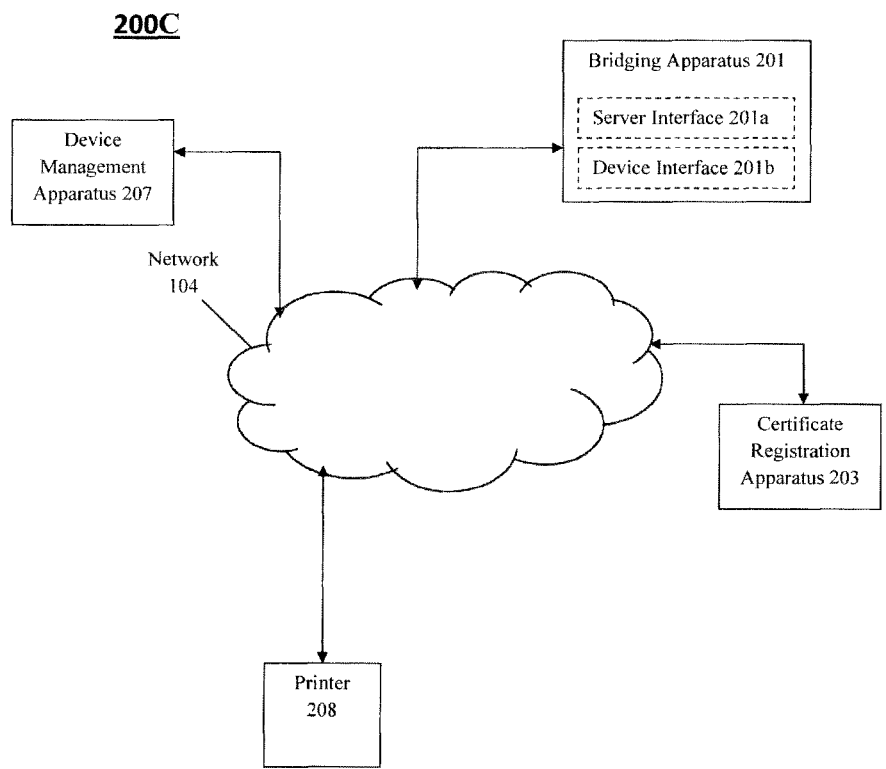
FIG. 2C shows a block diagram of a system for certificate deployment in a PKI, according to another exemplary embodiment.

FIG. 2C shows schematically a system 200C, according to another exemplary embodiment. The system 200C is similar to the system 200A except that the system additionally includes a device management unit 207 and a printer 208.

The device management apparatus 207 manages and collects data from a plurality of devices throughout the network 104. For example, the device management apparatus 207 may store information on the printer 208. This information may include a name/identifier, functions (black & white, duplex, fax, scanning, N-up, etc.), physical location, network address (IP address, MAC address, etc.), output technology (laser, inkjet solid ink, thermal, other technology, etc.) supply level (consumable types such as paper and toner>empty/low/ok, etc.), pages per job (e.g., 1, 2, 6-10, etc.), color technology (professional color, convenience color, etc), properties (manufacturer, model, serial number, etc), etc. In addition, the bridging apparatus 201 may utilize the device management apparatus 207 to obtain information from the printer 208. For example, the information could correspond to the required information in a CSR request or it could be additional information needed to verify the identity of the device.

The printer 208 can be, for example a printer/scanner, printer/scanner/fax, etc., and/or may be configured as shown in FIG. 5, which is discussed infra.

While FIG. 2C shows a single printer 208, it should be appreciated that the network environment can have an arbitrary number of printer devices.

Otherwise, operations of the elements of the system 200C are similar to those discussed in connection with the corresponding elements of the system 200A of FIG. 2A.

Figure 3:
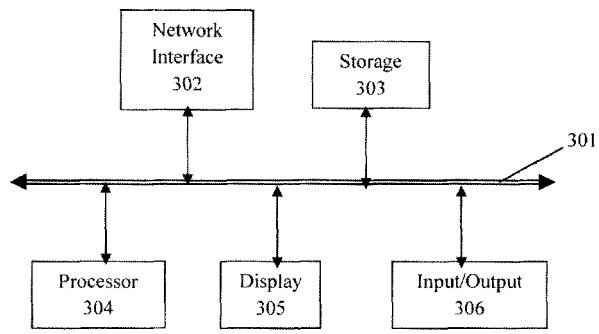
FIG. 3 shows a block diagram of an exemplary configuration of a terminal.

An example of a configuration of a terminal that may be employed for bridging apparatus 201 and device 203 of FIG. 2A is shown schematically in FIG. 3. In FIG. 3, a terminal device 300 includes a processor (or central processing unit) 304 that communicates with a number of other components, including network interface 302, storage 303, display 305 and other input/output (such as mouse, touchpad, stylus, keyboard/keypad, microphone and/or speaker with voice/speech interface and/or recognition software, etc.) 306, by way of an internal bus 301. The storage 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 302 provides a connection (for example, by way of an Ethernet connection or other network connection which supports any desired network protocol such as, but not limited to TCP/IP, IPX, IPX/SPX, or NetBEUI) to a network (e.g. network 104 of FIG. 2A). The network interface is configured to communicate with any particular device amongst plural heterogeneous devices that may be included in a system in a communication format native to the particular device. The network interface may determine an appropriate communication format native to the particular device by any of various known approaches. For example, the network interface may refer to a database or table, maintained internally or by an outside source, to determine an appropriate communication format native to the device. As another example, the network interface may access an Application Program Interface (API) of the particular device, in order to determine an appropriate communication format native to the device.

Additional aspects or components of the terminal device 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
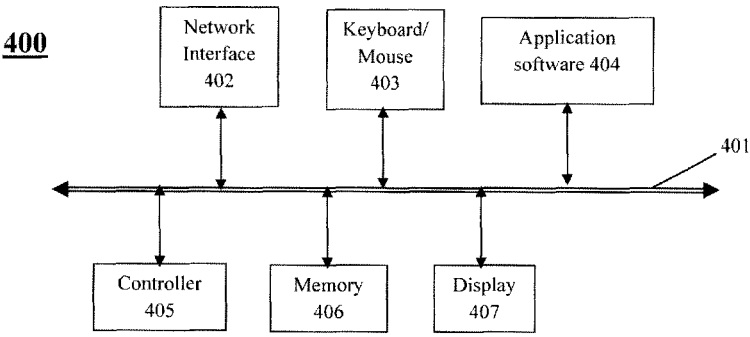
FIG. 4 shows a block diagram of an exemplary configuration of a computing device.

FIG. 4 shows an exemplary constitution of a computer 400 that can be configured (for example, through software) to operate (at least in part) as the certificate registration apparatus 202 or device 203 of FIG. 2A. As shown in FIG. 4, the management unit 400 includes a controller (or central processing unit) 405 that communicates with a number of other components, including network interface 402, keyboard/mouse 403, application software 404, memory or storage part 406 and display 407, by way of a system bus 401. The computing device 400 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities.

The MFP 500 shown in FIG. 5 includes a controller 502, and various elements connected to the controller 502 by an internal bus 501. The controller 502 controls and monitors operations of the MFP 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), scanning 504, printing 505, a user interface 506 and a network interface (I/F) 507.

Storage 503 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 502 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 507, and interactions with users through the user interface 506.

The network interface 507 is utilized by the MFP 500 to communicate with other network-connected devices such as a terminal, a bridging apparatus (e.g. the bridging apparatus 201 of FIG. 2A) or a certificate registration apparatus 202 (e.g. certificate registration apparatus 202 of FIG. 2B) and receive data requests, print jobs, user interfaces, etc. Such network interface 507 enables an administrative terminal to upload programs (e.g., for generating key pairs or self-signed certificates, generating certificate requests, importing intermediate certificates, etc.) and data (e.g., certificates, key pairs, etc.), such as via a SOAP (Simple Object Access Protocol) interface, to the MFP 500.

The user interface 506 includes one or more electronic visual displays that display, under control of controller 502, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 507 can be displayed on the display screen.

The display 506a does not need to be integral with, or embedded in, a housing of the MFP 500, but may simply be coupled to the MFP 500 by either a wire or a wireless connection. The user I/O 506 may include keys and/or buttons (such as graphical keys or buttons, or other graphical elements, of a GUI on a touchscreen display) for inputting information or requesting various operations. Alternatively, the user I/O 506 and the display 506a may be operated by a keyboard, a mouse, a remote control, voice recognition (e.g., through a speaker/microphone), or eye-movement tracking, or a combination thereof.

A web interface (not shown) may optionally be provided along with the user interface 506 and network interface 507 to enable a user or administrator to access various web content that may be of interest. For example, digital certificates are commonly obtained through the web or Internet from a certificate authority (CA), and the CA may provide a web portal for submitting requests for certificates or otherwise.

Scanning 504, printing 505, and network interface 507 are otherwise conventional, and therefore, a detailed description of such conventional aspects is omitted in the interest of clarity and brevity.

The MFP 500 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

FIG. 6 shows a table indicating the information required for creating a CSR for a particular device. As shown there are four required fields which are version, distinguished name (DN), public key and attributes. It should be noted that these four fields are required in PKCS#10. However, the fields are not limited to the previously mentioned items. They may include other fields as well.

The version field is the version of the protocol currently supported. For example, if the protocol PKCS#10 was used for the CSR, a "0" would be placed in the field since "0" currently identifies the version v1.7.

The distinguished name (DN) field is the name of the particular device. For example, the DN can be a domain name such as "www.ricoh.com/printer64". It should be noted that the DN is uniquely mapped to a public and private key pair at a time and this mapping is enforced by the CA to prevent issues that arise from ambiguity.

The public key field is the key generated by either the particular device or a bridging apparatus on behalf of the particular device. The key can be created by a plurality of algorithms which include but are not limited to RSA, Diffie-Hellman, ElGamal, Pallier, etc.

The attribute field contains additional information about the particular device. This may include information on the location of the particular device, the company which owns the particular device, the postal address of the company, etc. The attribute field is used to enhance or confirm the identity of the particular device.

FIG. 7 shows a detailed version of the attribute field in the CSR. As shown the attribute field includes more fields such as organization, department, town/city, province/region/county/state, country, and e-mail address. However, the previously mentioned fields are merely exemplary and do not represent the spectrum of fields that can be used for the attribute field.

The organization field is the name of the organization that owns the particular device. This includes but is not limited to companies, corporations, partnerships, governments, non-profit organizations, etc. The name entered in the field should be the legal name of the organization and includes any suffix which denotes the type of organization to prevent any ambiguity. For example, in FIG. 7, the organization in the organization field is "Ricoh Americas Corporation".

The department field is the name of the organizational unit of the organization that the particular device is a part of. For example, the department of a company may include accounting, legal, human resources, finance, etc. In the case of government, the department field may be the various agencies such as the United States Patent and Trademark Office, the Bureau of Industry and Security, National Security Agency, etc.

The address field and the country field are used to denote the location of the particular device. The address field may be utilized by an administrator at a CA to not only confirm the identity of the device but may also be used as an "out of band" method to communicate with the user and confirm that the user of the particular device sent the CSR.

The e-mail address field is the current e-mail address used either by the user of the particular device or the department of the organization the particular device is a part of. The user of the e-mail address field is similar to the address and country field as it may be another "out of band" method utilized by the administrator at the CA to communicate with the user and confirm that the user of the particular device sent the CSR.

Figure 8:
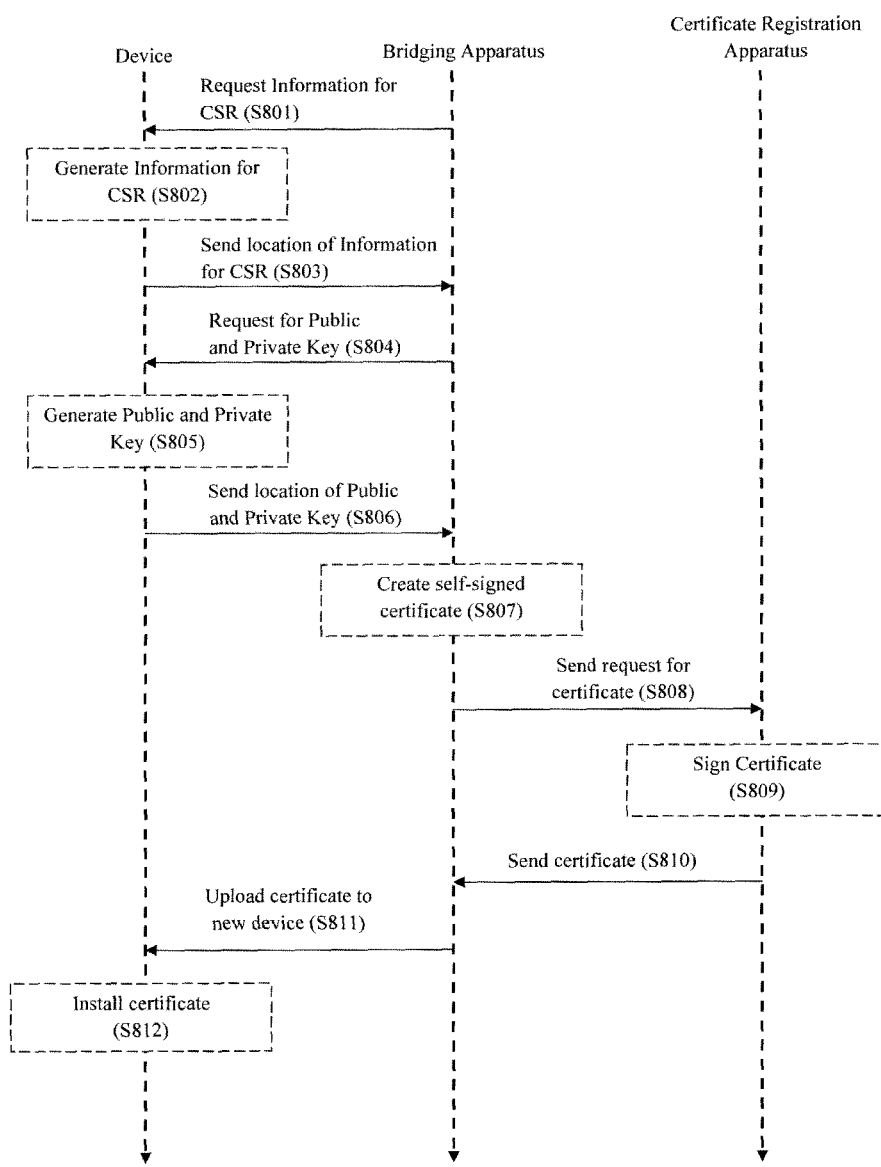
FIG. 8 shows a schematic diagram of an example of communication flow in any one or more of the systems shown in FIGS. 2A-2C.

FIG. 8 shows a process performed in, for example, the system 200A-200C (illustrated in FIGS. 2A-2C), according to an exemplary embodiment.

When a user of an organization wants to certify that his device is a trusted device within the organization that the user is employed at, he or she may submit a CSR to a certificate deployment apparatus. In this case the certificate deployment apparatus may be a server located in the organization and was previously certified by a CA to distribute certificates to devices currently being used by employees of the organization. However, the device that the user wants to have certified may not conform to the protocol currently being used by the certificate deployment apparatus. The user may use a bridging apparatus which can be the user's personal computer at work in order to facilitate the certification of his device instead. In order to do this, the user must first have certification from the certificate registration apparatus or the CA. This allows the user the authority to request a certificate from the certificate registration apparatus without having to perform an "out of band" communication with the administrator of the certificate registration apparatus. Since the user is already certified, the certificate registration apparatus can verify this without any need for the user and the administrator to be in contact, making the process automated and consequently more efficient.

In the case that the user is certified, the user sends a request using the bridging apparatus to the device for information (i.e. attributes) required for the CSR (step S801). In response to the request, the device generates the required information (step S802), stores it in a secure location and sends the location of the required information to the bridging apparatus (step S803). After the bridging apparatus has received the required information, the bridging apparatus sends another request to the device (step S804). This time the request is for the bridging to generate a public and private key pair. In response to this request, the device generates a public and private key pair according to an algorithm native to the device, stores it in a secure location and sends the location of the key to the bridging apparatus (step S805). Once the bridging apparatus acquires the information needed for creating the CSR, the bridging apparatus creates a certificate using the required information and self-signs the certificate by encrypting it with the user's own certificate (step S807). For security, the bridging apparatus also encrypts the message being sent to the certificate registration apparatus with the public key of the certificate registration apparatus. Then, the bridging apparatus sends the encrypted certificate to the certificate registration apparatus (step S08).

After receiving the message from the bridging apparatus, the certificate registration apparatus decrypts the message with its own private key and further decrypts the certificate using information from the user's certificate. This verifies that the user, who was previously certified, sent the certificate. Once the certificate registration apparatus confirms that the user is certified and was the one who sent the message, the certificate registration apparatus proceeds to digitally sign the received certificate. To facilitate this, the certificate registration apparatus calculates the fingerprint of the received certificate using a standard algorithm (i.e. SHA) and encrypts it using the private key of the certificate registration apparatus to create a digital signature (step S809). The certificate registration apparatus further encrypts the certificate and the digital signature with the public key of device 203. After performing the encryption, the certificate registration apparatus sends the originally received certificate along with the corresponding digital signature to the bridging apparatus (step S810). Once the bridging apparatus receives the certificate and the corresponding digital signature, the bridging apparatus decrypts it using the private key of device 203 and forwards it to the device (step S811) to cause the device 203 to install the certificate the corresponding digital signature (step S812).

As illustrated, the device does not have to be in contact with the certificate registration apparatus or a CA in order to obtain a digitally signed certificate. A bridging apparatus on behalf of the device can be used to facilitate the communications between the device and the certificate registration apparatus instead. This is especially useful in an environment in which most of the electronic devices and equipment in the organization that the user is employed at do not have the protocol used by the certificate registration apparatus implemented.

Figure 9:
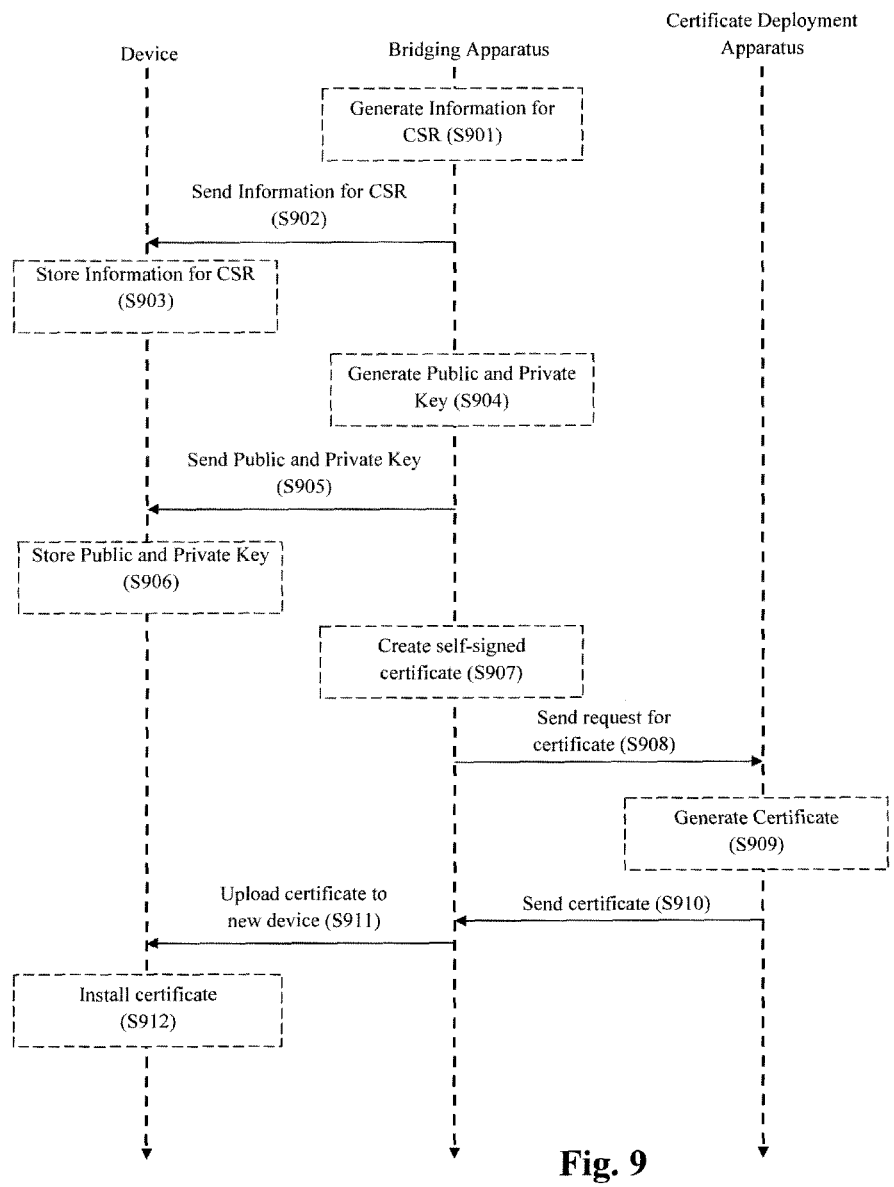
FIG. 9 shows a schematic diagram of another example of communication flow in any one or more of the systems shown in FIGS. 2A-2C.

FIG. 9 shows a process performed in, for example, the system 200A-200C (illustrated in FIGS. 2A-2C), according to another exemplary embodiment.

Similar to the process in FIG. 8, when a user, previously certified, wants to have one of his or her devices which do not conform to a protocol current used by the certificate registration apparatus certified as a trusted device, the user may use a bridging apparatus to facilitate the communication between the two instead. However, in this case, the device may not have the capabilities of retrieving the information needed for the CSR or may not be able to generate public and private key. In both these cases, it is possible that the bridging apparatus may instead generate the information along with the public and private key instead.

First, the user uses the bridging apparatus to generate information (i.e. attributes) needed for the CSR (step S901). This information may be manually typed in by the user or the bridging apparatus may request the information from a device management apparatus currently managing the device instead (assuming that there is a device management apparatus managing the device). After the information required for CSR is created, the bridging apparatus sends the CSR to the device (step S902). The device then stores the CSR sent by the bridging apparatus (step S903). The purpose of this exchange is to let the device know that the bridging apparatus is acting on behalf of the device in order to obtain a certificate for the device and to store the information required for CSR for future use as well. Next, the bridging apparatus generates a public and private key using an algorithm native to itself (step S904). Similar to before, the bridging apparatus sends the key back to the device (step S905) and the device stores the key (step S906). Once the bridging apparatus has the information needed for creating the CSR, the bridging apparatus creates a certificate using the required information and the public key and self-signs the certificate by encrypting it with the user's own certificate (step S907). For security, the bridging apparatus also encrypts the message being sent to the certificate registration apparatus with the public key of the certificate registration apparatus. Then, the bridging apparatus sends the encrypted certificate to the certificate registration apparatus (step S908).

After receiving the message from the bridging apparatus, the certificate registration apparatus decrypts the message with its own private key and further decrypts the certificate using information from the user's certificate. Once the certificate registration apparatus confirms that the user is certified and was the one who sent the message, the certificate registration apparatus proceeds to digitally sign the received certificate (step S909). In addition, the certificate registration apparatus encrypts the certificate and the digital signature with the public key of bridging apparatus 201. After performing the encryption, the certificate registration apparatus sends the originally received certificate along with the corresponding digital signature to the bridging apparatus (step S910). Once the bridging apparatus receives the certificate and the corresponding digital signature, the bridging apparatus decrypts it using the private key of the user and forwards it to the device 203 (step S911) where the device 203 proceeds to install the certificate the corresponding digital signature (step S912).

As illustrated, the device is not required to obtain information required for CSR, nor is the device needed to even generate its own public and private key. A bridging apparatus on behalf of the device can be used to perform those functions instead. This is especially useful in an environment in which most of the electronic devices and equipment in the organization that the user is employed at do not have the capabilities of obtaining information required for CSR or generating its own public and private key.

Figure 10:
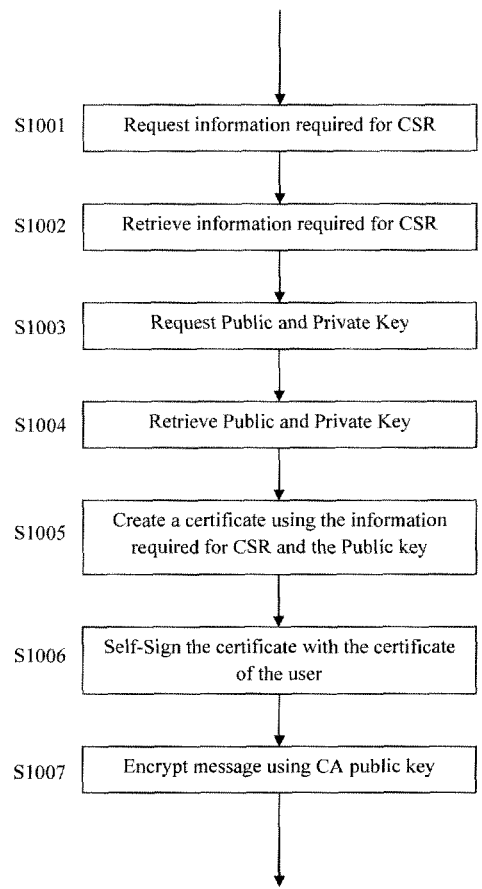
FIG. 10 shows a flow chart of a method performed by a bridging apparatus shown in FIG. 2A.

FIG. 10 shows a process performed by a bridging apparatus (e.g., 201 of FIG. 2A), for creating a certificate for a client device that is not configured to conform to a specific certification protocol in a public key infrastructure according to an exemplary embodiment.

When a certified user wants to obtain a certificate for one his or her electronic devices (i.e. device 203 of FIG. 2A) which do not have the protocol currently in use by the certificate registration apparatus (i.e. certificate registration apparatus 202 of FIG. 2A) to identify that the device itself is trusted, the user utilizes the bridging apparatus 201 to facilitate the communication instead.

Figure 11A:
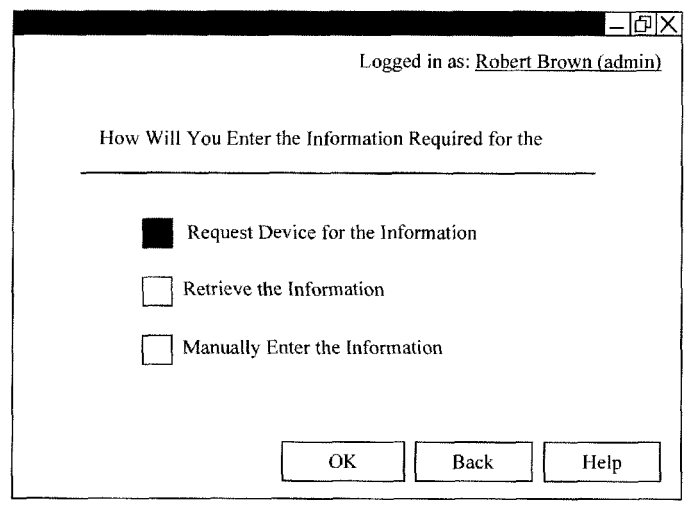
Figure 11B:
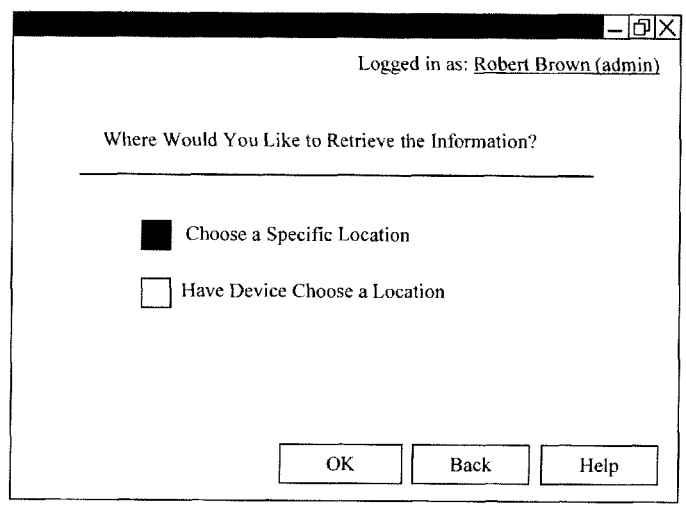

The user of the bridging apparatus first is given a choice of how to obtain the information required for the CSR as shown in FIG. 11A. As shown, the user has the option of requesting the information directly from the device 203, manually entering the required information, or retrieving the required information from another source such as a device management apparatus 207 of FIG. 2C. It should be noted that in case that the device 203 cannot generate the information, the user may be advised to manually enter the information or retrieve elsewhere. In this case the user has chosen to request the device 203 for the required information (step S1001).

Figure 11C:
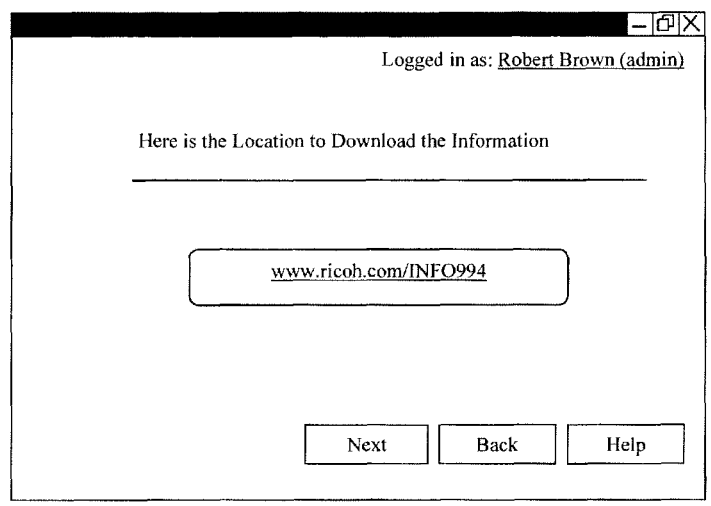

Next, the user is given a set of options on how to retrieve the required information that the device 203 has generated. For example, as shown in FIG. 11, the user has the option of specifying the location for the device 203 to upload the required information to or the user may ask the device 203 to upload the required information to another location which will be disclosed to the user, instead. In this case, the user has requested the device 203 to upload to a location specified by the device 203. Next, the device 203 returns the location in the form of a URL as shown in FIG. 11C which can be utilized by the user to download the required information (step S1002).

Figure 11D:
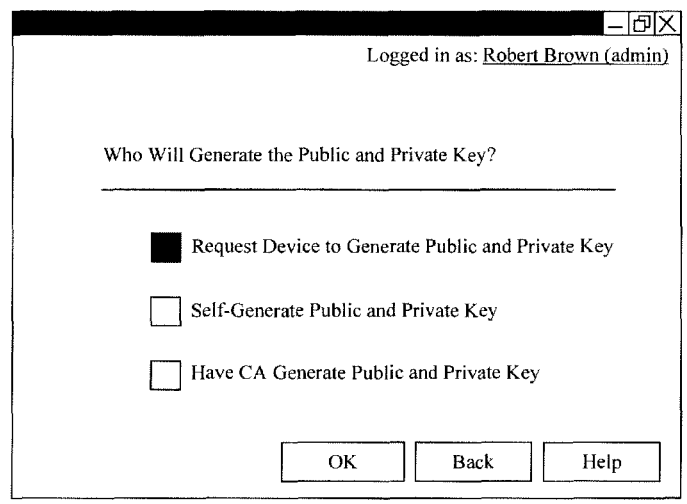

After obtaining the required information, the user is given a set of options on who will generate the public and private key. For example as shown in FIG. 11D, the user has the option of specifying either the bridging apparatus 201, the certificate registration apparatus 202 or the device 203 for generating the public and private key. In this case the user has requested the device 203 to generate the public and private key (step S1003).

Figure 11E:
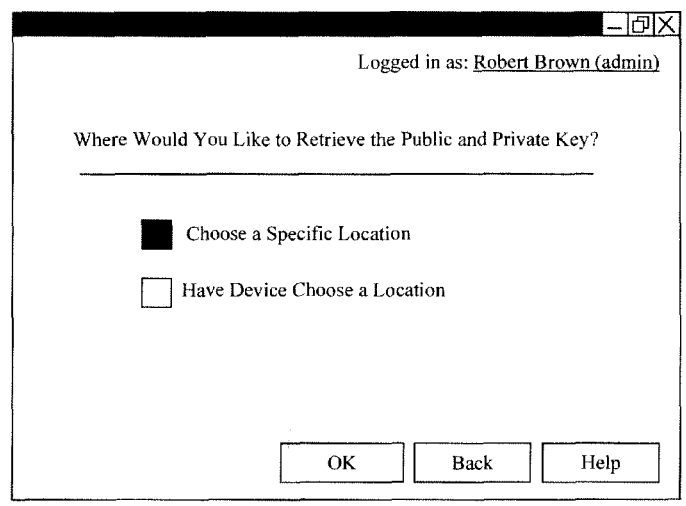
Figure 11F:
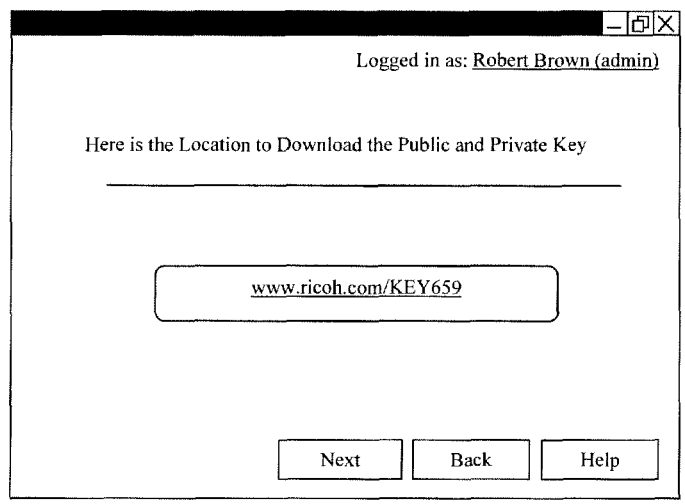

Next, in the same manner as before, the user is given a set of options on how to retrieve the public and private key that the device 203 has generated. For example, as shown in FIG. 11E, the user has the option of specifying the location for the device 203 to upload the required information to or the user may ask the device 203 to upload the required information to another location which will be disclosed to the user, instead. In this case, the user has requested the device 203 to upload to a location specified by the device 203. Next, the device 203 returns the location in the form of a URL as shown in FIG. 11F which can be utilized by the user to download the required information (step S1004).

After obtaining the required information for the CSR as well as the public and private key, the user is shown a screen confirming if the information that the user wishes to send to the certificate registration apparatus 202 is correct as shown in FIG. 11G. In the case that the user is satisfied, the user may click on the "submit" button. This will cause the bridging apparatus 201 to create a certificate using the required information previously obtained and the public key previously generated. Then the bridging apparatus 201 self-signs the certificate by encrypting it with the certificate of the user (step S1006). In addition the bridging apparatus encrypts the message using the public key of the certificate registration apparatus 202 as well for security (step S1007).

Figure 12:
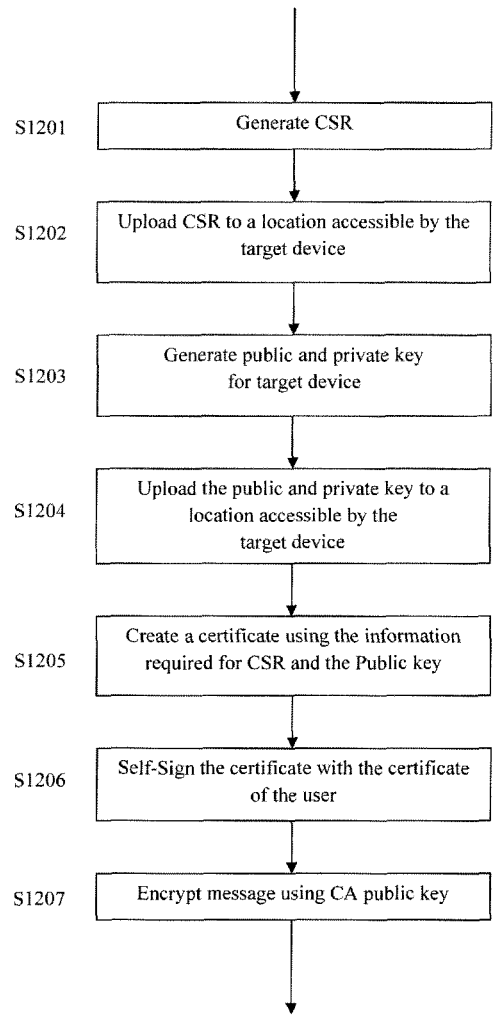
FIG. 12 shows a flow chart of a method performed by a bridging apparatus shown in FIG. 2A.

FIG. 12 shows a process performed by a bridging apparatus (e.g., 201 of FIG. 2A), for creating a certificate for a client device that is not configured to conform to a specific certification protocol in a public key infrastructure according to another exemplary embodiment.

Similar to the process in FIG. 10, when a certified user wants to obtain a certificate for one his or her electronic devices which do not have the protocol currently in use by the certificate registration apparatus to identify that the device itself is trusted, the user utilizes the bridging apparatus 201 to facilitate the communication instead.

Figure 13A:
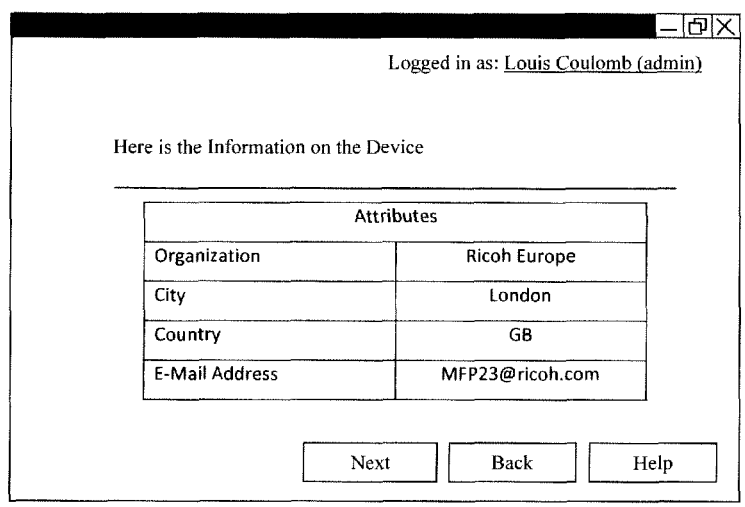
FIGS. 13A and 13B show examples of user interface display screens displayed on a bridging apparatus.

As shown previously in FIG. 11A, the user is first given a choice of how to obtain the information required for the CSR. However, in this case the user has selected to retrieve the required information from a source other than the device 203 such as within the bridging apparatus itself or a device management apparatus 207 of FIG. 2C (step S1201). After obtaining the required information, the bridging apparatus displays it to the user such as shown in FIG. 13A. Then, the user chooses a specific location which is accessible to the device 203 to upload the CSR and returns the specific location of the CSR to the device 203 to cause the device 203 to download the CSR from the specific location and store it (step S202). This allows the device 203 to know that the bridging apparatus 201 has created a CSR on behalf of it.

Figure 13B:
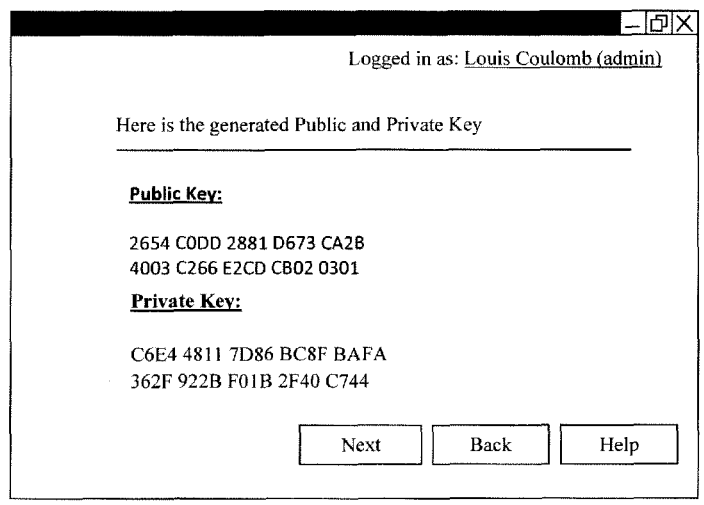

Next, in the same manner as before as shown in FIG. 11D, the user is given a set of options on how to obtain the public and private key. However, in this case the user has selected to generate the public and private key pair using the bridging apparatus 201 (step S1203). After generating the public and private key pair, the bridging apparatus displays it to the user such as shown in FIG. 13B. Then, the user chooses a specific location which is accessible to the device 203 to upload the public and private key pair and returns the specific location of the public and private key to the device 203 to cause the device 203 to download the public and private key from the specific location and store it (step S1204).

After obtaining the required information for the CSR as well as the public and private key, the user is once again shown a screen confirming if the information that the user wishes to send to the certificate registration apparatus 202 is correct. In the case that the user is satisfied, the user may click on the "submit" button. This will cause the bridging apparatus 201 to create a certificate using the required information previously obtained and the public key previously generated. Then the bridging apparatus 201 self-signs the certificate by encrypting it with certificate of the user (step S1206). In addition the bridging apparatus encrypts the message using the public key of the certificate registration apparatus 202 as well for security (step S1207).

Figure 14:
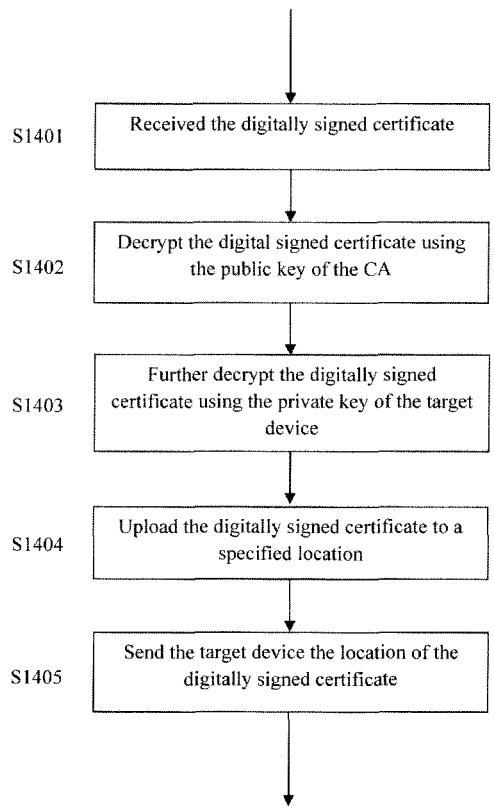
FIG. 14 shows a flow chart of a method performed by a bridging apparatus.

FIG. 14 shows a process performed by a bridging apparatus (e.g., 202 of FIG. 2A), after receiving the certificate digitally signed by the certificate registration apparatus.

When the bridging apparatus 201 receives the digitally signed certificate from the certificate registration apparatus (step S1401), the bridging apparatus 201 first decrypts the certificate using the public key of the certificate registration apparatus 201 (step S1402). Then the bridging apparatus 201 further decrypts the certificate using the private key of device 203 since the certificate was previously encrypted using the public key of the device 203 (step S1403). Next, after the certificate has been completely decrypted, the bridging apparatus 201 uploads the certificate to a specific location that is accessible to the device 203 (step S1404). Then the bridging apparatus 201 sends the specific location to the device 203 to cause the device 203 to download the certificate from the specified location and install it (step S1405).

The orders in which the steps are performed in the aforementioned methods are not limited to those shown in the examples of FIGS. 8-10, 12 and 14, and may be switched as long as similar results are achieved. Also, it should be noted that the methods illustrated in the examples of FIGS. 8-10, 12 and 14 may be implemented using any of the systems described in connection with FIGS. 2A-2C.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A certificate deployment bridging apparatus configured to be connected to a network to operate, within a public key infrastructure (PKI), as a bridge between (i) a certificate registration apparatus that communicates with a certificate deployment target based on a specific certificate deployment protocol and (ii) a target deployment device that is not configured to conform to the specific certificate deployment protocol and is not configured to generate public key and private key, said certificate deployment apparatus comprising:
a server interface part that communicates, in conformance with the specific certificate deployment protocol, with a certificate registration apparatus through a network; and
a device interface part that (1) generates specific items of information for a certificate signing request corresponding to the target deployment device and sends to the target deployment device the specific items of information to be stored in the target deployment device, and (2) generates a key pair including a private key and a public key for the target deployment device and sends to the target deployment device the key pair to be stored in the target deployment device,
wherein the certificate deployment bridging apparatus, after generating the specific items of information for the certificate signing request corresponding to the target deployment device and generating the key pair of the private key and the public key for the target deployment device, generates a self-signed certificate based on the specific items of information corresponding to the target deployment device and including the public key of the target deployment device, in conformance with the specific certificate deployment protocol, employs a certificate from a certificate authority to encrypt the self-signed certificate and transmits the encrypted self-signed certificate, through the server interface part, to the certificate registration apparatus.

2. The certificate deployment bridging apparatus of claim 1, wherein
the certificate deployment bridging apparatus obtains a new certificate encrypted by the public key of the key pair, from the certificate registration apparatus, applies the private key of the key pair to extract the new certificate, and causes the new certificate to be installed to the target deployment device.

3. The certificate deployment bridging apparatus of claim 1, wherein
the target deployment device, in response to the request from the certificate deployment bridging apparatus requesting the specific items of information, uploads the requested items of information in the certificate signing request to a specific location specified by the certificate deployment bridging apparatus, and
the certificate deployment bridging apparatus downloads the items of information, uploaded to the specific location by the target deployment device.

4. The certificate deployment bridging apparatus of claim 1, wherein
the target deployment device, in response to the request from the certificate deployment bridging apparatus requesting the specific items of information, uploads to a specific location the requested items of information in the certificate signing request and returns location information identifying the specific location to the certificate deployment bridging apparatus, and
the certificate deployment bridging apparatus downloads from the specific location the items of information in the certificate signing request.

5. The certificate deployment bridging apparatus of claim 1, wherein
the target deployment device, in response to the request from the certificate deployment bridging apparatus, generates the pair of private key and public key, and uploads the public key to a specific location specified by the certificate deployment bridging apparatus, and
the certificate deployment bridging apparatus downloads the public key generated by the target deployment device, from the specific location.

6. The certificate deployment bridging apparatus of claim 1, wherein
the target deployment device, in response to the request from the certificate deployment bridging apparatus, generates the pair of private key and public key, and uploads the public key to a specific location and returns location information identifying the specific location to the certificate deployment bridging apparatus, and
the certificate deployment bridging apparatus downloads the public key generated by the target deployment device, from the specific location.

7. The certificate deployment bridging apparatus of claim 1, wherein
said certificate deployment apparatus uploads the self-signed certificate to a specific location accessible by the target deployment device, and causes the target deployment device to download the self-signed certificate from the specific location.

8. A certificate deployment system for a public key infrastructure (PKI), the certificate deployment system comprising:
a certificate registration apparatus that communicates through a network with a certificate authority based on a specific certificate deployment protocol;
a target deployment device that is not configured to conform to the specific certificate deployment protocol and is not configured to generate public key and private key;
a certificate deployment bridging apparatus operating as a bridge between the certificate registration apparatus that conforms to the specific certificate deployment protocol and the target deployment device that does not conform to the specific certificate deployment protocol, wherein
said certificate bridging deployment apparatus generates specific items of information identifying the target deployment device and sends to the target deployment device the specific items of information to be stored in the target deployment device, and then generates a certificate signing request corresponding to the target deployment device, and then generates a key pair including a private key and a public key and sends to the target deployment device the key pair to be stored in the target deployment device, and then generates a self-signed certificate based on the items of information identifying the target deployment device and including the public key of the key pair, in conformance with the specific certificate deployment protocol, and employ a certificate received from the certificate authority to encrypt the self-signed certificate and transmit the encrypted self-signed certificate to the certificate registration apparatus.

9. The certificate deployment system of claim 8, further comprising:

a device management apparatus configured to manage devices connected to the network and maintain device information corresponding to the managed devices, wherein said certificate deployment bridging apparatus obtains at least some of the specific items of information corresponding to the target deployment device from the device management apparatus.

10. The certificate deployment system of claim 8, wherein said certificate deployment bridging apparatus obtains the specific items of information directly from the target deployment device.

11. The certificate deployment system of claim 8, wherein said certificate deployment bridging apparatus generates the certificate signing request and uploads the certificate signing request to a specific location accessible by the target deployment device, and causes the certificate signing request to be downloaded by the target deployment device from the specific location.

12. The certificate deployment system of claim 8, wherein said certificate deployment bridging apparatus generates the key pair including the private key and the public key and uploads the key pair to a specific location accessible by the target deployment device, and causes the target deployment device to download the key pair from the specific location.

13. The certificate deployment system of claim 8, wherein said certificate deployment bridging apparatus uploads the self-signed certificate to a specific location accessible by the target deployment device, and causes the target deployment device to download the self-signed certificate from the specific location.

14. The certificate deployment system of claim 8, wherein the certificate deployment bridging apparatus obtains a new certificate encrypted by the public key of the key pair, from the certificate registration apparatus, applies the private key of the key pair to extract the new certificate, and cause the new certificate to be installed by the target deployment device.

15. A certificate deployment bridging application including one or more programs of instructions embodied in a non-transitory computer readable medium and executable by a processor of a terminal apparatus to perform a method comprising:
   (a) communicating in conformance with a specific certificate deployment protocol with a certificate registration apparatus through a network;
   (b) communicating with a target deployment device that is not configured to conform to the specific certificate deployment protocol and is not configured to generate public key and private key;
   (c) generating specific items of information in a certificate signing request identifying the target deployment device and sending to the target deployment device the specific items of information to be stored in the target deployment device;
   (d) generating, after generating the specific items of information in (c), a key pair including a private key and a public key for the target deployment device and sending to the target deployment device the key pair to be stored in the target deployment device;
   (e) generating a self-signed certificate, after generating the key pair in (d), based on the items of information identifying the target deployment device and including the public key of the key pair, in conformance with the specific certificate deployment protocol;
   (d) employing a certificate from a certificate authority to encrypt the self-signed certificate and transmitting the encrypted self-signed certificate to the certificate registration apparatus;
   (e) obtaining a new certificate encrypted by the public key of the key pair, applying the private key of the key pair to extract the new certificate, and uploading the new certificate to the target deployment device.

16. The certificate deployment bridging application of claim 15, wherein the method performed by the terminal apparatus executing the certificate deployment bridging application further comprises:
   uploading the self-signed certificate to a specific location accessible by the target deployment device, and causing the target deployment device to download the self-signed certificate from the specific location.

17. The certificate deployment bridging application of claim 15, wherein the method performed by the terminal apparatus executing the certificate deployment bridging application further comprises:
   obtaining at least some of the specific items of information corresponding to the target deployment device from a device management apparatus that manages devices connected to the network and maintains device information corresponding to the managed devices,
   wherein said at least some of the specific items of information obtained from the device management apparatus are employed to generate a self-signed certificate.

18. The certificate deployment bridging application of claim 15, wherein the method performed by the terminal apparatus executing the certificate deployment bridging application further comprises:
   uploading the key pair to a specific location accessible by the target deployment device, and causing the target deployment device to download the key pair from the specific location.

19. The certificate deployment bridging application of claim 15, wherein the method performed by the terminal apparatus executing the certificate deployment bridging application further comprises:
   generating the certificate signing request and uploading the certificate signing request to a specific location accessible by the target deployment device, and causing the certificate signing request to be downloaded by the target deployment device from the specific location.

* * * * *